United States Patent [19]
Nan et al.

[11] Patent Number: 5,610,663
[45] Date of Patent: Mar. 11, 1997

[54] MULTI-FREQUENCY DISPLAYING DEVICE FOR DISPLAYING BOTH TELEVISION AND PERSONAL COMPUTER VIDEO SIGNALS

[75] Inventors: Liu P. Nan; Leu J. Hwei, both of Taoyuan, Taiwan

[73] Assignee: Acer Peripherals, Inc., Taoyuan, Taiwan

[21] Appl. No.: 587,620

[22] Filed: Jan. 17, 1996

[51] Int. Cl.$^6$ ....................................................... H04M 3/27
[52] U.S. Cl. ............................................ 348/554; 345/213
[58] Field of Search ................................... 348/542, 543, 348/555, 553, 554, 556, 558; 345/213, 115, 118, 119; H04N 3/27, 5/46

[56] References Cited

U.S. PATENT DOCUMENTS

| | | | |
|---|---|---|---|
| 4,460,918 | 7/1984 | Flasza | 348/554 |
| 4,612,574 | 9/1986 | Barnes | 348/542 |
| 4,679,091 | 7/1987 | Kikuchi | 348/543 |
| 4,743,958 | 5/1988 | Bannister et al. | 348/554 |
| 5,502,503 | 3/1996 | Koz | 348/554 |

FOREIGN PATENT DOCUMENTS 0157570  6/1988  Japan ........................... H04N 3/270

Primary Examiner—John K. Peng
Assistant Examiner—Peter Kovacs
Attorney, Agent, or Firm—The Kline Law Firm

[57] ABSTRACT

The present invention relates to a multi-frequency displaying device for displaying both TV and PC video signals. The displaying device comprises a displaying screen for displaying TV or PC video signals, a video signal processing circuit for converting the TV video signals into TV RGB signals and TV sync signals, a sync circuit for converting the TV sync signals or PC sync signals into vertical and horizontal deflection signals, and a display control circuit for displaying the TV RGB signals or PC RGB signals in the display screen in synchronization with the vertical and horizontal deflection signals. The sync circuit comprises a multi-frequency horizontal oscillator for generating clock signals to convert the TV sync signals or PC sync signals with different frequencies into the horizontal deflection signals according to the switch.

1 Claim, 2 Drawing Sheets

MULTI-FREQUENCY DISPLAYING DEVICE FOR DISPLAYING BOTH TELEVISION AND PERSONAL COMPUTER VIDEO SIGNALS

BACKGROUND OF THE INVENTION

1. Field of the Invention

The present invention relates to a displaying device for displaying video signals, and more particularly, to a multi-frequency displaying device for displaying both TV (television) and PC (personal computer) video signals.

2. Description of the Prior Art

TV monitors shared to display both TV and PC video signals are commonly seen in many home electronics or commercial advertisement applications because big TV monitors are much cheaper than comparable computer monitors. But since TV video signals and PC video signals have various horizontal displaying speeds, they must be processed first before displaying over a displaying screen of a TV monitor.

Please refer to FIG.1. FIG.1 shows a block diagram of a prior art displaying device 10 which is a TV monitor for displaying both TV video signals (NTSC system, 15.75 kHz horizontal frequency) and PC video signals (VGA—video graphic array, 31.47 kHz horizontal frequency) in one horizontal frequency (31.47 kHz) over a CRT (cathode ray tube) 18. The PC video signals comprises PC RGB signals from three signal lines and PC sync signals (H/V) from two signal lines of a cable connected to a personal computer (not shown).

The device 10 comprises a front end circuit 11 for converting TV video signals over port 111 into TV Y/R-Y/B-Y video signals over port 112 and TV sync signals over port 113, a dual scan circuit 12 for doubling each TV Y/R-Y/B-Y video signals, a video signal processing circuit 13 for converting the TV Y/R-Y/B-Y video signals from the dual scan circuit 12 into TV RGB signals which are output over port 131, a timing generator 16 for generating clock signals for the dual scan circuit 12 and also doubling the frequency of the TV sync signals from 15.75 kHz into 31.47 kHz, a sync circuit 17 for converting the TV sync signals from the timing generator 16 or PC sync signals into vertical and horizontal deflection signals over port 171 and 172 according to a switch 15 (connection not shown), and a display control circuit 14 for displaying the TV RGB signals or PC RGB signals synchronized with the vertical and horizontal deflection signals from the sync circuit 17 according to the switch 15. The dual scan circuit 12 comprises an A/D (analog to digital) converter 121 for digitizing the TV Y/R-Y/B-Y video signals, a dual scan processing unit 122 for processing each digitized video signal to achieve the dual scan effect, and a D/A (digital to analog) converter for converting the output from the dual scan processing circuit 122 into analog output.

The D/A and A/D conversion processes performed by the dual scan circuit 12 cause certain losses in the video images contained in the output TV Y/R-Y/B-Y video signals when compared with the input TV Y/R-Y/B-Y video signals and thus reduces the image quality displayed in the CRT 18 of the displaying device 10. Besides, the dual scan circuit 12 coupled with the timing generator 16 for doubling TV video signals are quite complex when compared with a conventional TV.

SUMMARY OF THE INVENTION

It is therefore a primary objective of the present invention to provide an alternative displaying device to display both TV and PC video signals without sacrificing the quality of the image quality of the TV video signals and also to eliminate the complex the dual scan circuit 12 and the timing generator 16 of the prior art design. Briefly, in a preferred embodiment, the present invention includes a displaying device having a displaying screen for displaying TV video signals or PC video signals having PC RGB signals and PC sync signals according to a switch for selecting the TV or PC video signals comprising:

(1) a video signal processing circuit for converting the TV video signals into TV RGB signals and TV sync signals;

(2) a sync circuit for converting the TV sync signals or PC sync signals into vertical and horizontal deflection signals according to the switch; said sync circuit comprising a multi-frequency horizontal oscillator for generating clock signals to convert the TV sync signals or PC sync signals with different frequencies into the horizontal deflection signals according to the switch; and (3) a display control circuit for displaying the TV RGB signals or PC RGB signals in synchronization with the vertical and horizontal deflection signals in the display screen according to the switch.

It is an advantage of the present invention that it comprises a multi-frequency horizontal oscillator for generating clock signals to convert the TV sync signals or PC sync signals with various clock frequencies into the horizontal deflection signals according to a switch so that the image quality can be maintained and there is no need to duplicate the TV video signals by using the dual scan circuit 12 and the timing generator 16 of the prior design shown in FIG.1.

These and other objects and the advantages of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 2:
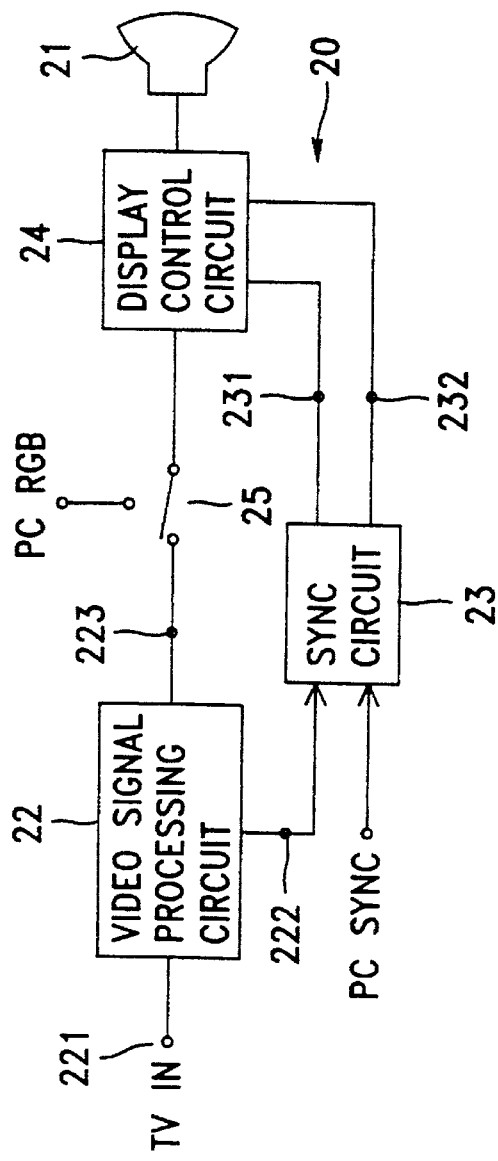
FIG.2 shows a block diagram of a displaying device according to the present invention.

Please refer to FIG.2. It shows a displaying device 20 having a displaying screen 21 for displaying TV (television) video signals or PC (personal computer) video signals having PC RGB signals and PC sync signals according to a switch 25 for selecting the TV or PC video signals comprising a video signal processing circuit 22 for converting the TV video signals into TV RGB signals and TV sync signals, a sync circuit 23 for converting the TV sync signals or PC sync signals into vertical and horizontal deflection signals according to the switch 25, and a display control circuit 24 for displaying the TV RGB signals or PC RGB signals in synchronization with the vertical and horizontal deflection signals in the display screen 21 according to the switch 25.

The video signal processing circuit 22 is equivalent to the function of the front end circuit 11 coupled with the video signal processing circuit 13. Instead of duplicating the TV video signals like the prior design, the device 20 of the present invention simply converts the TV video signals inputted from port 221 into TV RGB signals over port 223 in 15.75 kHz horizontal frequency. The sync circuit 23 converts the TV sync signals from port 222 or PC sync signals into vertical and horizontal deflection signals over ports 231 and 232 according to the switch 25 (connection not shown). The sync circuit 23 is different from the sync circuit 17 in that it generates horizontal deflection signals with two different frequencies over port 232 so that the display control circuit 24 can display the TV RGB signals in 15.75 kHz horizontal frequency and PC RGB signals in 31.47 kHz horizontal frequency. Since the TV RGB video signals are displayed directly in its original frequency (15.75 kHz), the image quality displayed over the CRT 21 will be better than the prior art design because no D/A and A/D conversions are performed over the TV video signals.

Figure 3:
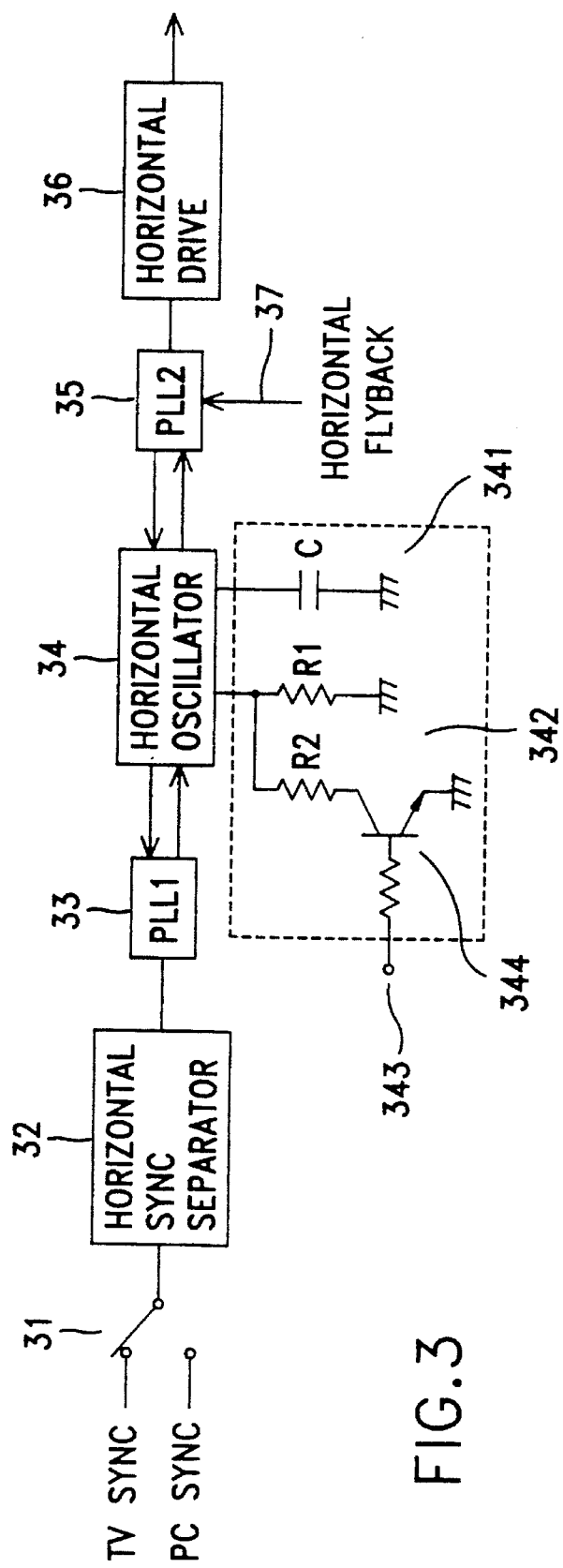
FIG.3 shows part of the sync circuit shown in FIG.2.

FIG.3 shows part of the sync circuit 23 shown in FIG.2 for processing TV or PC horizontal sync signals. It comprises a multi-frequency horizontal oscillator 34 for generating clock signals to convert the TV sync signals or PC sync signals with different frequencies into the horizontal deflection signals according to the switch 25.

It comprises a switch 31 which is controlled by the switch 25 (connection not shown) for connecting the TV or PC sync signals, a horizontal sync separator 32 for separating the horizontal sync signals out of the input signals, a first phase locked loop 33 (PLL1) for synchronizing the horizontal sync signals with a multi-frequency horizontal oscillator 34 and a second phase locked loop 35 (PLL2) for synchronizing the horizontal flyback from the display control circuit 24 over port 37 and the oscillator 34, and a horizontal drive 36 for generating horizontal deflection signals to the display control circuit 24.

Figure 1:
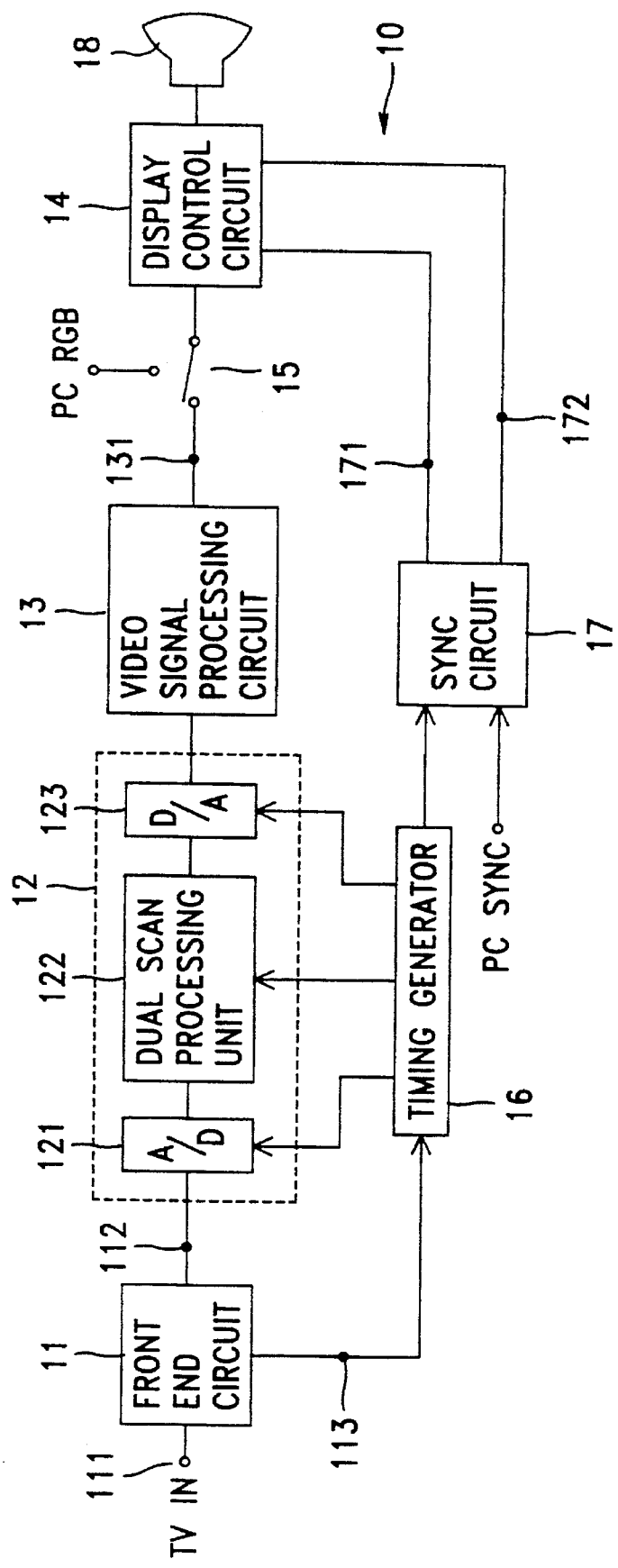
FIG.1 shows a block diagram of a prior art displaying device.

The oscillator 34 is used for generating clock signals to convert the TV sync signals or PC sync signals with different frequencies into the horizontal deflection signals according to the switch 25. The oscillator 34 comprises a RC circuit 341 for controlling the time constant of the oscillator 34. The RC circuit 341 comprises a variable resistor 342 which comprises two resistors R1 and R2 in parallel and a transistor 344 connected to the resistor R2. The on and off status of the transistor 344 is controlled by the switch 25 (connection not shown) through port 343. When port 343 is high, the transistor 344 is turned on which makes the two resistors R1 and R2 in parallel and the RC time constant of the RC circuit 341 becomes $C*(R1*R2)/(R1+R2)$. When port 343 is low, the transistor 344 is turned off and the RC time constant of the RC circuit is raised to $C*R1$. By changing the RC time constant of the RC circuit 341 the horizontal oscillation frequency of the oscillator 34 is switched between 15.75 kHz and 31.47 kHz for processing either TV or PC horizontal sync signals. This design reduces the need for a complex dual scan circuit 12 shown in FIG.1 and also increases the image quality displayed over the CRT 21 because the TV video signals are displayed over its original frequency and no conversions are performed over the TV video signals.

The above disclosure is not intended as limiting. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A displaying device having a displaying screen for displaying TV (television) video signals or PC (personal computer) video signals having PC RGB signals and PC sync signals according to a switch for selecting the TV or PC video signals comprising:

(1) a video signal processing circuit for converting the TV video signals into TV RGB signals and TV sync signals;

(2) a sync circuit for converting the TV sync signals or PC sync signals into vertical and horizontal deflection signals according to the switch; said sync circuit comprising a multi-frequency horizontal oscillator for generating clock signals to convert the TV sync signals or PC sync signals with different frequencies into the horizontal deflection signals according to the switch; and (3) a display control circuit for displaying the TV RGB signals or PC RGB signals in synchronization with the vertical and horizontal deflection signals in the display screen according to the switch;

wherein the horizontal oscillator comprises a RC circuit with a variable resistor controlled by the switch to control the oscillation frequency of the horizontal oscillator.

\* \* \* \* \*